J. DAVIS.
HANGER OR COUPLING.
APPLICATION FILED JAN. 10, 1919.

1,350,008.

Patented Aug. 17, 1920.

INVENTOR:
Jacob Davis
BY Edward R. Alexander
ATTORNEY

UNITED STATES PATENT OFFICE.

JACOB DAVIS, OF CLEVELAND, OHIO.

HANGER OR COUPLING.

1,350,008.  Specification of Letters Patent.  Patented Aug. 17, 1920.

Application filed January 10, 1919. Serial No. 270,457.

*To all whom it may concern:*

Be it known that I, JACOB DAVIS, a citizen of the United States, residing at Cleveland, in the county of Cuyahoga and State of Ohio, have invented certain new and useful Improvements in and Relating to Hangers or Couplings, of which the following is a specification.

This invention relates to a hanger or coupling member adapted to support bodies or articles, particularly lighting or other fixtures from walls and ceilings.

One object of the invention is to provide a hanger which may be readily applied to a gas pipe within or projecting from the wall or ceiling.

Another object of the invention is to provide a hanger of a construction which is relatively simple, and capable of resisting all necessary strains imparted to it when positioned, removed or the elements to be supported are connected to it.

Another object of the invention is to so construct the hanger that cement or insulating material may be readily placed within the hanger under pressure, to thereby insure durability and a unitary structure.

Other objects of the invention will be apparent to those skilled in the art to which my invention relates from the following description taken in connection with the accompanying drawing.

For the purpose of illustration, I have, in the accompanying drawing, shown and herein described one form of apparatus embodying my invention.

Figure 2:
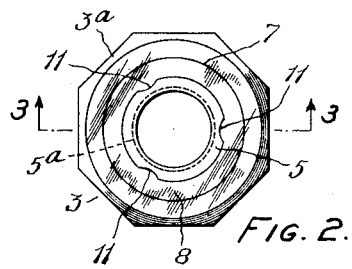
Fig. 2 is a top plan view of the hanger.

In the drawings, 1 indicates a building wall, such as a ceiling, from which a support 2 extends. This support, in the preferred application of my invention consists of a gas pipe. The pipe 2 is embedded in the wall 1 in any desired manner and the exposed end $2^a$ thereof is provided by the disconnection or removal of the exposed pipe or pipes (not shown) which carry the gas lighting fixture or fixtures.

3 indicates as an entirety my improved hanger or coupling which is connected to the pipe end $2^a$. The hanger, when so connected, serves to close the pipe end $2^a$ (in the preferred form of the invention) and forms a suitable support and connection for some article or body which is to be supported from or associated with the wall 1.

One application of the invention may consist in supporting an electric light fixture, one element of which—a pipe or rod—is shown at 4, where it is desired to change the lighting arrangements of a house or building from gas to electric. If desired, a hickey (not shown) may first be connected to the hanger 3. Under such circumstance, the gas fixture is removed, as above set forth, thus leaving the gas pipe end $2^a$. The hanger or coupling 3 is then connected or screwed onto the pipe, as will be later set forth, and thereafter the electric fixture (or some element thereof) is connected to the hanger.

Referring to the hanger 3, $3^a$ indicates a casing or shell which is preferably in the shape of a nut, whereby it is adapted to be engaged by a tool such as a wrench. At one end, (by preference its outer end) the casing $3^a$ is provided with a closing plate $3^b$ and a socket $3^c$, which projects inwardly. The outer or open end of the socket is preferably flush with the outer face of the plate $3^b$, as shown. By preference, the casing $3^a$, plate $3^b$ and socket $3^c$ are formed integrally. The inner walls of the socket are screw-threaded, as indicated at $3^d$, whereby the article, body or electric fixture 4, or a hickey, may be readily connected thereto. The socket may be shaped or constructed to receive any desired object, and if desired, means other than screw-threads may be adopted as elements to provide a connection between the hanger and the article to be supported. 5 indicates a socket arranged within the casing $3^a$, the outer or opening end thereof preferably being arranged substantially flush with the opposite end of the casing. The inner walls of the socket 5 are provided with screw-threads $5^a$ which engage the screw-threaded end $2^a$ of the pipe 6 indicates a disk of insulating material, such as mica, interposed between the inner end or bottom walls of the sockets 3ᶜ and 5. As shown, the sockets 3ᶜ and 5 are somewhat smaller than the casing 3 and are arranged centrally thereof to form around them an annular space 7 which is filled with some material indicated at 8, which is capable of hardening and also of insulating the socket 5 from the casing 3ᵃ, plate 3ᵇ and socket 3ᶜ. The material 8 is placed in the space 7 in a plastic or semi-plastic condition. It may be placed in the space under pressure in order to insure complete filling thereof and proper positioning of the socket 5 while the material is setting.

Figure 5:
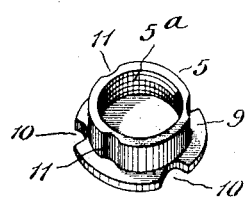
Fig. 5 is a perspective view of one of the sockets.

9 indicates a flange surrounding the inner end of the socket 5. The flange 9 serves as a shoulder against which the hardening and insulating material 8 sets to lock the socket in position. To insure a lock between the material 8 and the socket 5 to prevent movement of the latter relative to the casing 3ᵃ, the flange 9 is formed with a plurality of notches 10 (see Fig. 5) and the side walls of the socket 5 are formed with grooves 11 into which the material projects.

Figure 3:
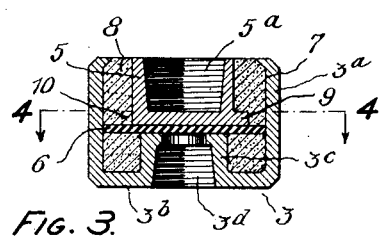
Fig. 3 is a vertical sectional view on the line 3—3 of Fig. 2.
Figure 1:
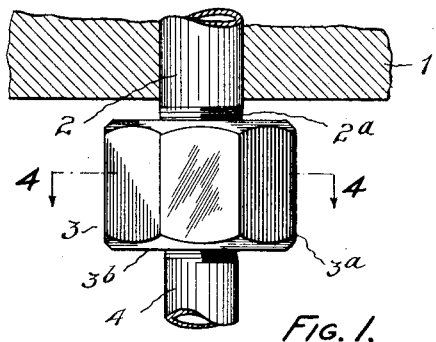
Figure 1 is an elevation of a hanger embodying my invention showing it in use coupling a gas pipe and the object to be supported together, the adjacent wall being shown in section.
Figure 7:
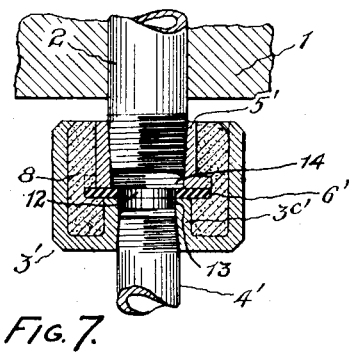
Fig. 7 is a vertical sectional view showing another modified form of the invention.
Figure 6:
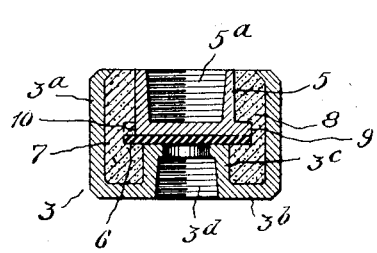
Fig. 6 is a vertical sectional view showing a slightly modified form of the invention.
Figure 4:
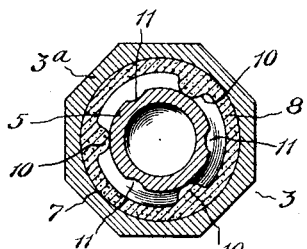
Fig. 4 is a horizontal sectional view on the line 4—4 of Figs. 1 and 3.

In the form of the invention shown in Fig. 3, the mica disk is of a size to snugly fit the interior walls of the casing 3ᵃ; but when so constructed, I have experienced slight difficulty in getting the space above and below the disk properly, entirely and uniformly filled with the material 8; accordingly, I prefer to use a round mica disk which has a diameter equal to that of the flange 9, as shown in Figs. 6 and 7. When a disk of this shape and size is used, it and the socket 5 can be readily positioned centrally of the casing 3ᵃ and the material 8 pressed in and uniformly packed or conditioned at all points surrounding the sockets 3ᶜ and 5, thus providing a relatively dense insulation around the sockets.

In Fig. 7 I have shown another modified form of the invention, where it is desirous to support from the gas pipe 2 a fixture carrying both electric and gas lights. Under these circumstances, it is equally important to insulate the gas pipe from the electric wires, and I have found that my hanger, indicated at 3′ in Fig. 7, may be readily adapted and used for this purpose by forming in the mica disk 6′, and inner end walls of the sockets 3ᶜ′ and 5′, openings 12, 13 and 14, respectively, which register with each other and permit the gas to flow from the pipe 2 to the pipe 4′.

By providing the casing 3ᵃ with a closing plate 3ᵇ at one end, I am enabled to more uniformly and firmly pack the material 8 in the space surrounding the sockets 3ᶜ and 5′ within the casing 3ᵃ, so that when it is hardened it is relatively dense and fills the entire space. This operation may be more advantageously effected by making the casing 3ᵃ, plate 3ᵇ and socket 3ᶜ integral, as shown, for the reason, among others, that it may be more readily positioned and supported in a machine which is capable of inserting and compressing the material 8 in the space 7. Furthermore, this latter form of construction insures a rigid connection between the casing 3ᵃ and one of the sockets; reduces the number of parts to be maintained by the insulating material against relative movement; and facilitates and reduces cost of manufacture and assembly of the elements.

From the foregoing description, it will be seen that the gas pipe 2 is entirely insulated from the electric wires which may be connected to or associated with either pipe, 4, 4′. It will also be seen that when the several elements are assembled and the insulating and supporting material 8 hardens, the socket 5 is maintained rigid relative to the casing 3ᵃ, so that both become a unitary structure which may first be positioned by means of a tool and thereafter form a support or hanger for the article to be supported. Accordingly, the material 8 is of such character that it will (1) resist the necessary torsional strains subjected to it when placed in position and the article is connected to it and (2) insulate the gas pipe from wires carrying a relatively high voltage.

To those skilled in the art of making apparatus of the class described, many alterations in construction and widely differing embodiments and applications of my invention will suggest themselves, without departing from the spirit and scope thereof. My description and disclosures herein are purely illustrative and are not intended to be in any sense limiting.

What I claim is:

1. In a device of the character described, the combination of a casing, a pair of sockets mounted in the casing and forming an annular space therein, insulating material filling the space within the casing around said sockets, and means for connecting one of said sockets to the casing, said means forming an end wall for the annular space.

2. In a device of the character described, the combination of a casing, a pair of sockets mounted in the casing and forming an annular space therein, insulating material filling the space within the casing around said sockets, and means for connecting one of said sockets to the casing, said means forming an end wall for the annular space, the other socket being formed with recesses into which the insulating material projects to lock the socket against movement.

3. In a device of the character described, the combination of a casing, a pair of sockets mounted in the casing and forming an annular space therein, insulating material filling the space within the casing around said sockets, means for connecting one of said sockets to the casing, said means forming an end wall for the annular space, and a flange on the other socket arranged to be embedded in the insulating material.

4. In a device of the character described, the combination of a casing. a pair of sockets mounted in the casing and forming an annular space therein, insulating material filling the space within the casing around said sockets, means for connecting one of said sockets to the casing, said means forming an end wall for the annular space, the other socket being formed with longitudinally extending recesses into which the insulating material projects to lock the socket against movement, and a flange on the other socket arranged to be embedded in the insulating material.

5. In a device of the character described, the combination of a casing, a socket mounted within the casing and forming an annular space therein, an annular plate surrounding the outer end of said socket and forming an end wall for the annular space, said casing, pocket and plate being formed integrally, a second socket within the casing, and insulating material filling the space surrounding said sockets and compressed against the sockets, casing and annular plate.

6. In a device of the character described, the combination of a casing, a socket mounted within the casing and forming an annular space therein, an annular plate surrounding the outer end of said socket and forming an end wall for the annular space, said casing, pocket and plate being formed integrally, a second socket within the casing, and insulating material filling the space surrounding said sockets, said second socket being provided with means to lock or embed it in said material to prevent movement thereof relative to the casing.

7. In a device of the character described, the combination of a casing, a pair of sockets mounted therein, a disk of insulating material arranged between said sockets, said sockets and disk being of a size to form a space around them within the casing, a plate surrounding the open end of one socket and connected thereto and to the adjacent end of the casing to close the space therein at one end, and insulating material filling the space within said casing.

8. In a device of the character described, the combination of a casing, a pair of sockets mounted in the casing and arranged to form an annular chamber therein, a disk of insulating material between the inner ends of said sockets and formed with an opening registering with openings formed in said inner ends, means for closing one end of said chamber, and insulating material filling the chamber in said casing.

In testimony whereof I affix my signature in the presence of two witnesses.

JACOB DAVIS.